(12) United States Patent
Pappalardo et al.

(10) Patent No.: US 6,369,561 B1
(45) Date of Patent: Apr. 9, 2002

(54) METHOD AND APPARATUS FOR CHARGING A BATTERY

(75) Inventors: Salvatore Pappalardo, Catania; Francesco Pulvirenti, Acireale; Filippo Marino, Tremestieri Etneo, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/560,763

(22) Filed: Apr. 27, 2000

(30) Foreign Application Priority Data

Apr. 29, 1999 (EP) .............................................. 99830257

(51) Int. Cl.[7] ................................................. G05F 1/40
(52) U.S. Cl. ........................ 323/285; 323/284; 323/901
(58) Field of Search ................................. 320/159, 160, 320/145, 152; 323/282, 284, 285, 901 908

(56) References Cited

U.S. PATENT DOCUMENTS

| 4,649,464 A | 3/1987 | Shono | 363/21 |
|---|---|---|---|
| 5,204,611 A | * 4/1993 | Nor et al. | 320/145 |
| 5,396,163 A | * 3/1995 | Nor et al. | 320/159 |
| 5,905,361 A | * 5/1999 | Saeki | 320/119 |

FOREIGN PATENT DOCUMENTS

| EP | 0 752 748 | 1/1997 |
|---|---|---|
| JP | 10 136579 | 8/1998 |
| WO | WO 93 19508 | 9/1993 |

* cited by examiner

Primary Examiner—Adolf Deneke Berhane
(74) Attorney, Agent, or Firm—Lisa Jorgenson; E. Russell Tarleton; SEED IP Law Group PLLC (57) ABSTRACT

A DC-DC converter having a current error amplifier and a voltage error amplifier connected in parallel to control the charging of the battery and a gradual turning off circuit for turning off gradually the current error amplifier in a battery charging end phase. In this way, the DC-DC converter is able to supply to the battery a battery charging current that remains constant until the battery full charge voltage is reached.

22 Claims, 5 Drawing Sheets

METHOD AND APPARATUS FOR CHARGING A BATTERY

TECHNICAL FIELD

The present invention refers to a DC-DC converter usable as a battery charger and to a method for charging a battery.

BACKGROUND OF THE INVENTION

For charging batteries, for example batteries of cell phones, the use of DC-DC converters operating as battery chargers and able to perform various charging algorithms for NiCd, NiMH and TiIon batteres is known.

Figure 1:
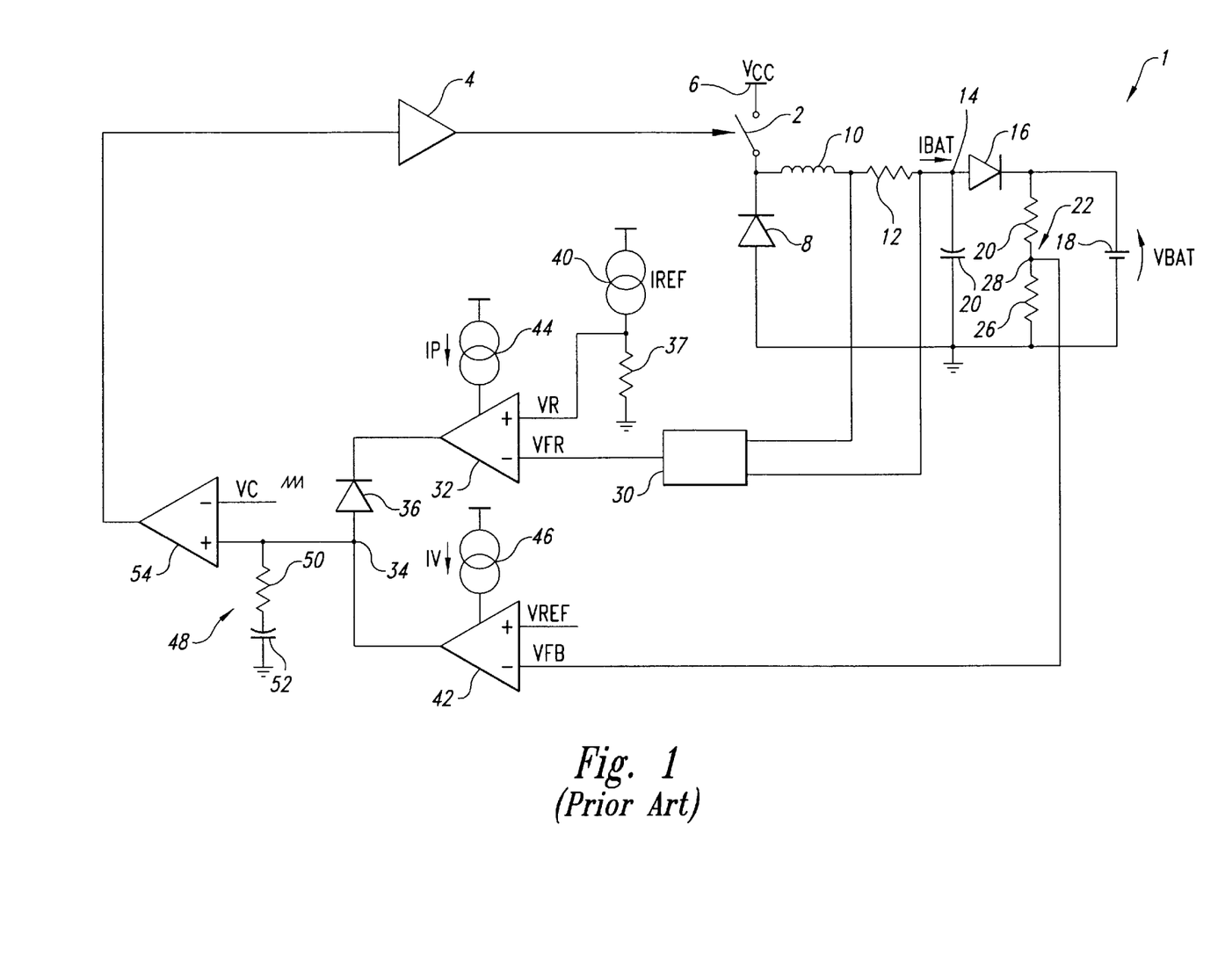
FIG. 1 shows a circuit diagram of a known DC-DC converter usable as a battery charger.

FIG. 1 illustrates a known step-down DC-DC converter usable as a battery charger.

The DC-DC converter, indicated as a whole by the reference number 1, comprises a switch 2, for example formed of a MOS transistor, the opening and closing whereof is controlled by a driving stage 4, and presenting a first terminal connected to a supply line 6 biased at the voltage VCC and a second terminal connected, via a diode 8, to ground; an inductor 10 and a sense resistor 12 series-connected between the second terminal of the switch 2 and a node 14, which is in turn connected, via a diode 16, to a positive pole of the battery 18 to be charged, which presents its negative pole connected to ground; a capacitor 20 connected between the node 14 and ground; and a voltage divider 22, formed of two resistors 24, 26, connected in parallel to the battery 18, and presenting an intermediate node 28 on which it supplies a voltage VFB proportional, through the division ratio, to the voltage VBAT present between the poles of the battery.

The DC-DC converter 1 further comprises a filtering stage 30, typically including an operational amplifier, presenting a first input and a second input terminals connected across the sense resistor 12, and an output terminal supplying the filtered voltage VFR present across the sense resistor 12; a differential current error amplifier 32 presenting an inverting terminal connected to the output terminal of the filtering stage 30, a non-inverting terminal receiving a reference voltage VR, and an output terminal connected to an output node 34 through a decoupling diode 36 presenting the anode terminal connected to the output node 34 and the cathode terminal connected to the output terminal of the current error amplifier 32; and a differential voltage error amplifier 42 presenting an inverting terminal connected to the intermediate node 28 of the voltage divider 22 and receiving from the latter the voltage VFB, a non-inverting terminal receiving a reference voltage VREF, and an output terminal connected directly to the output node 34.

In particular, the battery charsing current IBAT depends upon the reference voltage VR, which is generated by causing a constant current supplied by a current generator 40 connected in series to a resistor 37, to flow in the resistor 37 itself, the voltage present across the resistor 37 is then taken.

The current error amplifier 32 and the voltage error amplifier 42 are moreover biased through respective bias current generators 44, 46 supplying, respectively, a bias current IP and a bias current IV, both of which arc constant.

Finally, the DC-DC converter 1 comprises a zero-pole compensation network 48 including a resistor 50 and a capacitor 52 series-connected between the output node 34 and ground; and a differential comparator 54 known as PWM (Pulse Width Modulator) comparator, presenting an inverting terminal receiving a comparison voltage VC which has a sawtooth waveform, a non-inverting terminal connected to the output node 34, and an output terminal connected to the input of the driving stage 4 of the switch 2, basically operating as pulse width modulator and supplying at an output a voltage having a square waveform, the duty cycle whereof is a function of the voltage present on the output node 34 itself.

The operation of the DC-DC converter 1 is known and will here be referred to solely as regards the aspects necessary for understanding the problems lying at the basis of the present invention.

In particular, during the battery charging phase, the current error amplifier 32 prevails over the voltage error amplifier 42, and the DC-DC converter 1 operates in current regulation mode, behaving as a constant current generator.

During the current regulation phase, the battery charging current IBAT causes a voltage drop across the sense resistor 12, and this voltage, filtered by the filtering stage 30 so as to obtain the mean value thereof, is supplied to the current error amplifier 32, which operates to regulate this voltage so that it may assume a value equal to that of the reference voltage VR present on its own non-inverting terminal.

In parallel to the current error amplifier 32 there operates the voltage error amplifier 42, and in particular the current error amplifier 32 prevails over the voltage error amplifier 42 as long as the voltage VFB is lower than the reference voltage VREF, i.e., as long as the differential input voltage ΔV=VREF−VFB present between its input terminals is negative, thus determining the unbalancing of the voltage error amplifier 42.

In detail, the current error amplifier 32 and the voltage error amplifier 42 are designed so that, during the current regulation phase, the diode 36 is on, and the current error amplifier 32 controls, through the comparator 54, the duty cycle of the signal issued by the comparator 54 so as to render the voltages present on its inverting and non-inverting terminals equal.

The current error amplifier 32 performs a negative feedback. In fact, a possible variation in the battery charging current IBAT results in an unbalancing of the current error amplifier 32, with consequent variation in the voltage of the output node 34, and hence of the duty cycle of the output signal of the comparator 54, which acts to restore the programmed value of the battery charging current IBAT.

During the current regulation phase, the battery 18 is thus charged with a constant current according to the value programmed via the current generator 40 and the resistor 36, and the battery voltage VBAT increases progressively towards the full charge value.

In the vicinity of this full charge value, the battery charging current IBAT starts decreasing until it zeroes, after which the DC-DC converter 1 enters the voltage regulation phase in which the voltage error amplifier 42 prevails over the current error amplifier 32 and controls the battery voltage.

In particular, during transition from the current regulation phase to the voltage regulation phase, the voltage error amplifier 42 is balanced, the voltage of the output node 34 decreases progressively until the diode 36 is off, and the battery charging current IBAT decreases, thus unbalancing the current error amplifier 32.

One drawback of the DC-DC converter 1 described above lies in the circuit topology which causes the evolution of its operation from the current regulation phase to the voltage regulation phase to depend to a large extent upon the transcharacteristic of the differential input stage of the voltage error amplifier, a dependence which results in the DC-DC converter 1 not being able to supply a battery charging current IBAT that is constant up until the battery full charge voltage is reached.

SUMMARY OF THE INVENTION

The disclosed embodiments of the present invention provide a DC-DC converter usable as a battery charger, which is able to supply a battery charging current that is constant up until the battery full charge voltage is reached.

A further aspect of the disclosed embodiments of the present invention is providing a method for charging a battery that makes it possible to supply to the battery a charging current that is constant up until the battery full charge voltage is reached.

In accordance with the disclosed embodiments of the invention, a DC-DC converter usable as a battery charger is provided, including a current error amplifier means and voltage error amplifier means connected in parallel to control the charging phase of a battery, and a gradual turning off means gradually turning off the current error amplifier means in a battery charging end phase. Ideally, the gradually turning off means comprises first current generating means supplying a first bias current for the current error amplifier means and configured to decrease an amplitude in the battery charging end phase. Thus, the first bias current presents a substantially constant amplitude during the battery charging phase preceding the end phase.

In accordance with a method of the present invention disclosed herein, charging of a battery includes supplying a current to the battery using a DC-DC converter comprising current error amplifier means and voltage error amplifier means connected in parallel to control charging of the battery and gradually turning off the current error amplifier means in a battery charging end phase. Ideally, the gradually turning off step comprises supplying to the current error amplifier means a first bias current having a decreasing amplitude in the battery charging end phase. Thus, the first bias current presents a substantially constant amplitude during a battery charging phase preceding the end phase.

BRIEF DESCRIPTION OF THE DRAWINGS

For a better understanding of the present invention, a preferred embodiment thereof is now described, simply with the purpose of providing a non-limiting example, with reference to the attached drawings, in which.

DETAILED DESCRIPTION OF THE INVENTION

An embodiment of the present invention is based upon the principle of gradually turning off the current error amplifier 32 in a battery charging end phase by controlling the current generator 44 in such a way that the bias current IP supplied by it has a decreasing amplitude during the battery charging end phase and a substantially constant amplitude during the previous phase. In this way, the evolution of the operation of the DC-DC converter from the current regulation phase to the voltage regulation phase depends in a less marked way upon the transcharacteristic of the differential input stage of the voltage error amplifier, and hence the DC-DC converter is able to supply a constant battery charging current until the battery full charge voltage is reached, as will emerge more clearly from the ensuing description.

Figure 2:
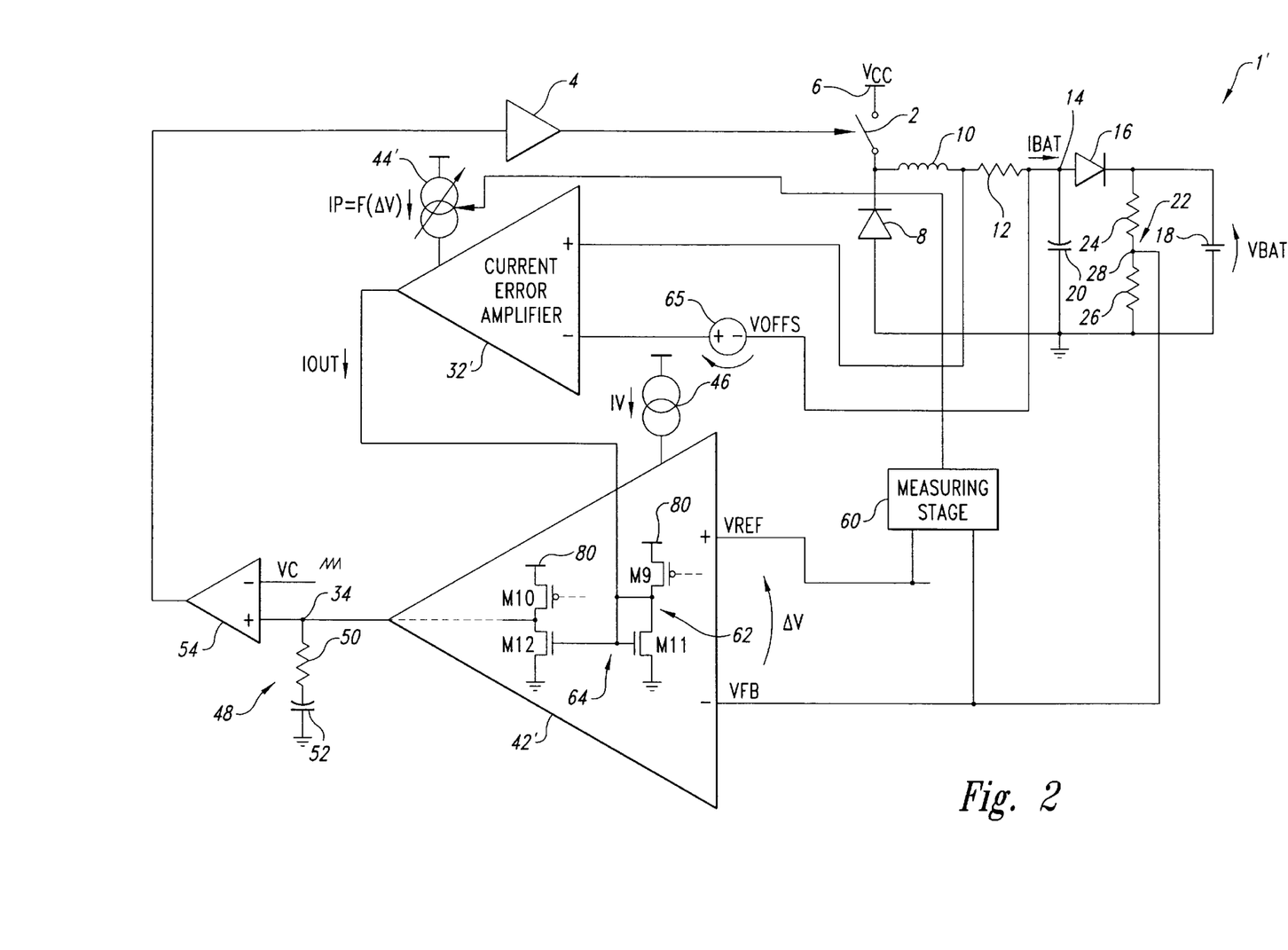
FIG. 2 shows a circuit diagram of a DC-DC converter usable as a battery charger according to the present invention.

FIG. 2 illustrates the circuit diagram of a DC-DC converter made according to the present invention, in which parts that are identical or equivalent to those of the DC-DC converter 1 are identified by the same reference numbers.

In particular, according to the present invention, the circuit topology of the DC-DC converter, indicated as a whole by 1', differs from that of the DC-DC converter 1 in that:

it comprises a measuring stage 60 for measuring the differential input voltage $\Delta V=VREF-VFB$ present between the non-inverting and inverting terminals of the voltage error amplifier, indicated by 42', and to control the current generator, indicated by 44', supplying the bias current IP for the current error amplifier, indicated by 32', as a function of the differential input voltage $\Delta V$ measured; and the current error amplifier 32' and the voltage error amplifier 42' share the same output stage 62.

In detail, the measuring stage 60 has a first and a second input terminals connected, respectively, to the non-inverting terminal and to the inverting terminal of the voltage error amplifier 42', and an output terminal supplying a turning off start control signal to the current generator 44' when the differential input voltage $\Delta V$ becomes smaller than a threshold value, i.e., when the battery voltage VBAT exceeds a preset threshold value, so as to command the start of the phase in which the bias current IP supplied by the current generator 44' presents a gradually decreasing amplitude.

Figure 3:
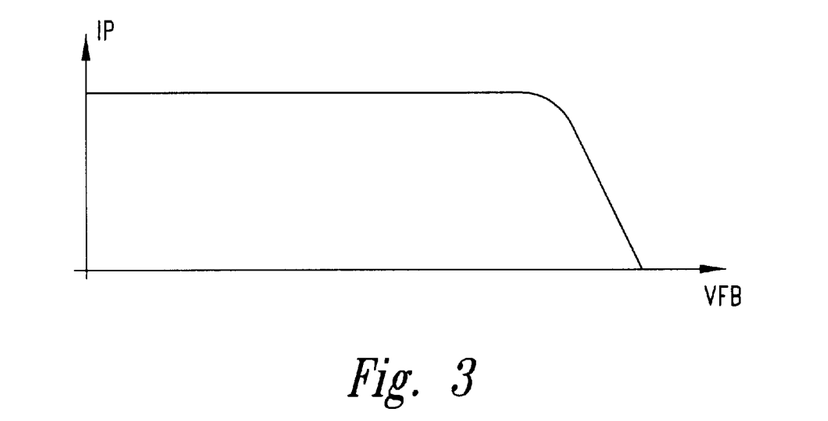
FIG. 3 shows the pattern of the current supplied by a current generator forming part of the DC-DC converter of FIG. 2.

During battery charging, the bias current IP thus presents the overall pattern illustrated in FIG. 3, in which its amplitude is substantially constant during the battery charging initial phase, i.e., for values of the voltage VFB lower than a certain threshold value, and decreases gradually down to a zero value during the battery charging end phase, i.e., for values of the voltage VFB close to the battery full charge voltage.

With reference again to FIG. 2, only the parts of the output stage 62 of the voltage error amplifier 42' that are useful for understanding the present invention are shown. In particular, the output stage 62 comprises a current mirror 64 including a first and a second NMOS transistor M11, M12 having gate terminals connected together and to the drain terminal of the transistor M11, which is therefore diode-connected, source terminals connected to ground, and drain terminals connected to respective loads, each of which consists of a PMOS transistor M9, M10, which are in turn connected to a supply line 80 set at the voltage VREG. In addition, the output terminal of the current error amplifier 32' is connected to the drain terminals of the transistors M9 and M11.

In this way, during the current regulation phase in which the current error amplifier 32' acts and the voltage error amplifier 42' is unbalanced, the current error amplifier 32' supplies a current IOUT necessary for keeping the output stage 62 in equilibrium; when the battery voltage VBAT approaches the full charge voltage, the current error amplifier 32' gradually turns off because the bias current IP supplied to it decreases, whilst the output stage 62 is kept in equilibrium as a result of the progressive balancing of the voltage error amplifier 42' (at end of charging we have, in fact, VFB=VREF, i.e., ΔV=0).

Figure 4:
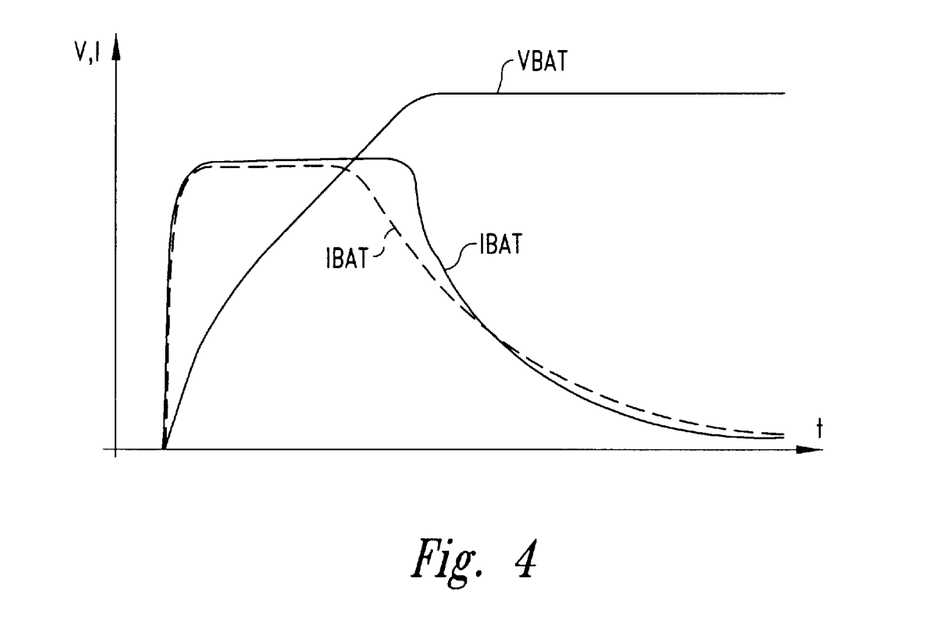
FIG. 4 shows the compared patterns of the voltage present across the battery and of the battery charging current that may be obtained with the DC-DC converter of FIG. 1 and with the DC-DC converter of FIG. 2.

FIG. 4 shows the patterns of the battery voltage VBAT present across the battery 18, of the battery charging current IBAT that may be obtained with the DC-DC converter 1, indicated by a dashed line, and of the battery charging current IBAT that may be obtained with the DC-DC converter 1', indicated by a continuous line.

As may be noted in the above-mentioned figure, the DC-DC converter 1' according to the present invention supplies a constant battery charging current IBAT until the battery full charge voltage is reached, unlike what occurs with the DC-DC converter 1, in which the battery charging current IBAT starts decreasing when the battery voltage VBAT has reached only approximately 80% of the full charge value.

Again with reference to FIG. 2, a further difference between the circuit topology of the converter 1 and that of the converter 1' lies in the circuitry responsible for programming the battery charging current IBAT.

In particular, programming of the battery charging current IBAT is carried out by connecting the inverting and non-inverting terminals of the current error amplifier 32' across the sense resistor 12 and by providing in the mesh including the sense resistor 12 and of the non-inverting and inverting terminals themselves an offset voltage generator 65 supplying an offset voltage VOFFS. In the example illustrated, the offset voltage generator 65 is set between one terminal of the sense resistor 12 and the inverting terminal of the current error amplifier 32'.

In this way, during the current regulation phase, i.e., when the current error amplifier 32' is balanced (the voltage between the inverting and non-inverting terminals is substantially zero), in the sense resistor 12 there flows a current that determines across it a voltage drop equal to VOFFS, and this current defines the battery charging current IBAT.

For example, in order to program a 1-A battery charging current using a 0.1-Ω sense resistor, it is sufficient to generate an offset voltage of 100 mV, which can be easily obtained by causing a constant current supplied by a current generator connected in series to a resistor to flow in the resistor itself; the voltage present across the resistor is then taken.

Figure 5:
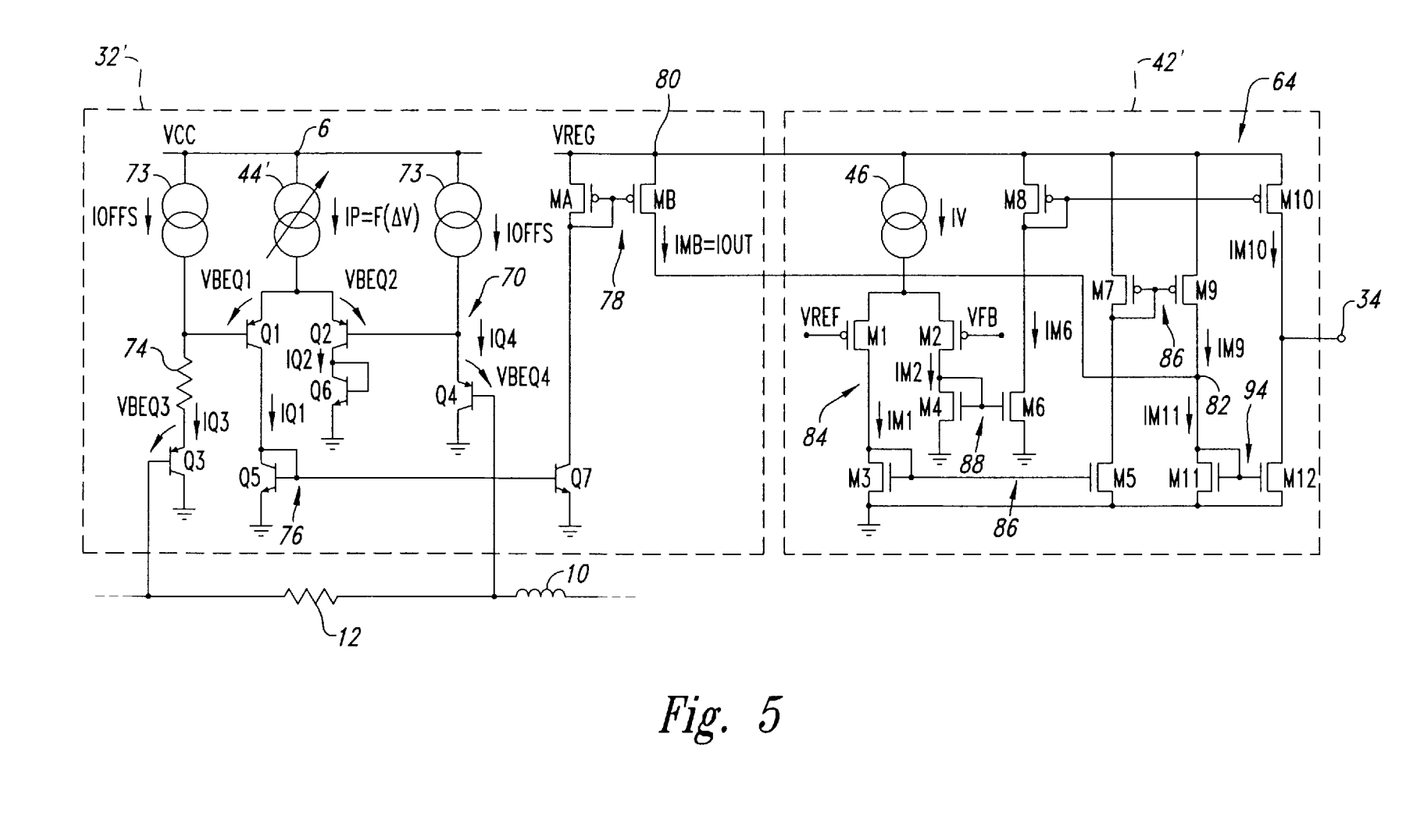
FIGS. 5 and 6 show more detailed circuit diagrams of parts of the DC-DC converter of FIG. 2.

FIG. 5 illustrates a more detailed circuit diagram of the current error amplifier 32' and of the voltage error amplifier 42', in which parts that are identical or equivalent to those of FIG. 2 are identified by the same reference numbers or letters.

According to what is illustrated in FIG. 5, the current error amplifier 32 includes an amplifier having a differential input stage 70 with PNP bipolar transistors in Darlington configuration so as to be compatible to ground, whilst the voltage error amplifier 42' includes a transconductance operational amplifier the input stage whereof is formed of PMOS transistors.

In detail, the differential input stage 70 of the current error amplifier 32' comprises a pair of PNP bipolar transistors Q1, Q2 connected in differential configuration, which present source terminals connected together and to the current generator 44' supplying the bias current IP=f(ΔV), the current generator 44' being in turn connected to the supply line 6, collector terminals connected to respective loads, and base terminals connected to the emitter terminals of respective PNP bipolar transistors Q3, Q4 defining, together with the transistors Q1 and Q2, two Darlington pairs and presenting collector terminals connected to ground and base terminals connected across the sense resistor 12.

The differential input stage 70 of the current error amplifier 32' further comprises a pair of current generators 73 supplying equal currents IOFFS and being connected between the base terminal of the transistor Q1 and of the transistor Q2, respectively, and the supply line 6; and a resistor 74 interposed between the base terminal of the transistor Q1 and the emitter terminal of the transistor Q3 and defining, together with the current generator 73, the offset voltage generator 64 (FIG. 2) described previously.

The load of the transistor Q2 consists of an NPN bipolar transistor Q6, which is diode-connected, i.e., which has the emitter terminal connected to ground and the base and collector terminals connected together and to the collector terminal of the bipolar transistor Q2.

The load of the transistor Q1 consists instead one of two NPN bipolar transistors Q5, Q7 forming a current mirror 76 having a unity mirror ratio. In particular, the transistors Q5, Q7 present emitter terminals connected to ground and base terminals connected together; in addition, the transistor Q5 is diode-connected and constitutes the load of the transistor Q1, i.e., it presents the collector terminal which is connected both to its own base terminal and to the collector terminal of the transistor Q1, whilst the collector terminal of the transistor Q7 is connected to one of two PMOS transistors MA, MB forming a current mirror 78 that has a unity mirror ratio. The transistors MA, MB present source terminals connected to the supply line 80, gate terminals connected together and to the drain terminal of the transistor MA, which is thus diode-connected, and drain terminals connected, respectively, to the collector terminal of the transistor Q7 and to a node 82 of the output stage 62 of the voltage error amplifier 42', In addition, the drain terminal of the transistor MB constitutes the output terminal of the current error amplifier 34, on which the current IOUT is supplied.

The voltage error amplifier 42' comprises a differential input stage 84 including a pair of PMOS transistors M1, M2 connected in differential configuration, which present source terminals connected together and to the current generator 46 supplying the bias current IV, this current generator in turn being connected to the supply line 80, drain terminals connected to respective loads, and gate terminals receiving the voltage VREF and the voltage VFB.

The load of the transistor M1 consists of one of two NMOS transistors M3, M5 forming a current mirror 86 having a unity mirror ratio, whilst the load of the transistor M2 consists of one of two NMOS transistors M4, M6 forming a current mirror 88 having a unity mirror ratio.

In particular, the transistors M3 and M5 present source terminals connected to ground and base terminals connected together; in addition, the transistor M3 is diode-connected and constitutes the load of the transistor M1, i.e., it presents the drain terminal that is connected both to its own gate terminal and to the drain terminal of the transistor M1. The transistors M4 and M6 present source terminals connected to ground and gate terminals connected together; in addition, the transistor M4 is diode-connected and constitutes the load of the transistor M2, i.e., it presents the drain terminal that is connected both to its own gate terminal and to the drain terminal of the transistor M2.

The drain terminal of the transistor M5 is connected to one of two PMOS transistors M7, M9 forming a current mirror 90 having a unity mirror ratio, whilst the drain terminal of the transistor M6 is connected to one of two PMOS transistors M8, M10 forming a current mirror 92 having a mirror ratio equal to N.

In particular, the transistors M7 and M9 present source terminals connected to the supply line 80 and gate terminals connected together; in addition, the transistor M7 is diode-connected and constitutes the load of the transistor M5, i.e., it presents the drain terminal that is connected both to its own gate terminal and to the drain terminal of the transistor M5. The transistors M8 and M10 present source terminals connected to the supply line 80 and gate terminals connected together; in addition, the transistor M8 is diode-connected and constitutes the load of the transistor M6, i.e., it presents the drain terminal that is connected both to its own gate terminal and to the drain terminal of the transistor M6.

The drain terminal of the transistor M9 is connected to a first one of two NMOS transistors M11, M12 forming a current mirror 94 having a mirror ratio equal to N, whilst the drain terminal of the transistor M10 is connected to the second one of the two transistors M11, M12 of the current mirror 94. In particular, the transistors M11 and M12 present source terminals connected to ground and gate terminals connected together; in addition, the transistor M11 is diode-connected and constitutes the load of the transistor M9, i.e., it presents the drain terminal that is connected both to its own gate terminal and to the drain terminal of the transistor M9, whilst the transistor M12 constitutes the load of the transistor M10 and presents the drain terminal that is connected to the drain terminal of the transistor M10. As already described with reference to FIG. 2, to the drain terminals of the transistors M9 and M11 there is further connected the drain terminal of the transistor MB.

The operation of the circuit illustrated in FIG. 5 will be described herebelow referring to the currents flowing in the various transistors, each of which will be identified by the letter I followed by the letters identifying the transistor to which the current refers.

In the battery charging initial phase, the battery is run down, and the voltage error amplifier 42' is completely unbalanced, with the differential input voltage $\Delta V = VREF - VFB$ present at its input terminals being maximum; in this condition, the transistor M1 is off, and all the current IV flows in the transistor M2, and hence is IM2=IV.

The current mirror 88 formed of the transistors M4, M6 thus mirrors the current IM2 with a unity mirror factor, and hence IM6=IM2=IV, whilst the current mirror 92 formed of the transistors M8, M10 mirrors the current IM6 with a mirror factor equal to N, and hence IM10=N*IM6=N*IV.

As a result of current regulation, the transistor M12 tends to balance this current, i.e., IM12=N*IV, and thus in the transistor M11 there will flow a current IM11=IM12/N=IV, which is also equal to the sum of the currents flowing in the transistors M9 and MB, i.e., IM11=IM12/N=IV=IM9+IM8.

In the transistor M9, however, no current is flowing in that the current mirror 90 of which it forms part mirrors with a unity mirror factor the current IM1, which in this phase is zero in that the transistor M1 is off. The current IM11 is therefore equal to the current IMB, which depends upon the bias current IP of the current error amplifier 32' and upon the degree of balancing of its differential input stage 70, and hence upon the battery charge state, and defines the above-mentioned output current IOUT supplied by the current error amplifier 32' to the output stage 62 (FIG. 2) shared between the current error amplifier 32' and the voltage error amplifier 42'.

According to one aspect of the present invention, the current generator 44' supplies a bias current IP the value whereof is, instant by instant, twice the difference between the currents flowing in the transistors M1 and M2, i.e., IP=2*(IM2−IM1).

In particular, the bias current IP depends upon the value of the differential input voltage $\Delta V$ and upon the bias current IV of the voltage error amplifier 42' according to the following relation that can be inferred from MOS transistor theory:

$$\Delta I = IM2 - IM1 = \mu \cdot \frac{C_{OX} \cdot W}{2 \cdot L} \cdot \Delta V \cdot \sqrt{\frac{2 \cdot IV}{\mu \cdot \frac{C_{OX} \cdot W}{2 \cdot L}} - \Delta V^2}$$

In this way, when the voltage error amplifier 42' is completely unbalanced, we have IM1=0, IM2=IV, and IP=2*IV=2*IM2, and the current required for balancing the current IM10 is equal to N*IM2, and hence it will be IMB=IM2=IP/2.

Since the mirror ratio of the current mirrors 76 and 78, formed of the transistors Q5–Q7 and MA–MB, respectively, is unity, then IMB=IQ1, and consequently in this phase the transistors Q1 and Q2 are traversed by the same current IP/2 and thus have the same base-emitter voltages, i.e., VBEQ1=VBEQ2.

In addition, since IQ3=IQ4=IOFFS=constant, also the transistors Q3 and Q4 have the same base-emitter voltages, i.e., VBEQ3=VBEQ4, and consequently the voltages of the base terminals of the transistors Q3 and Q4 differ precisely by a quantity equal to the offset voltage VOFFS introduced.

In these conditions of equilibrium, the voltage across the sense resistor 12 is equal to the offset voltage VOFFS; in the example considered, in which the offset voltage VOFFS is 100 mV and the resistance of the sense resistor 12 is 0.1δ, the battery charging current IBAT will thus be 1 A.

As the battery charging phase proceeds, the battery voltage VBAT increases gradually; thus the voltage VFB increases and the differential input voltage $\Delta V$ of the voltage error amplifier 42' decreases.

In the transistor M1 there thus starts to flow a current IM1 different from zero, and consequently the current IM2 tends to decrease so that, instant by instant, we always have IM1+IM2=IV. Consequently, in the transistor M10 there tends to flow a current IM10=N*IM2<N*IV which is to be balanced by the current flowing in the transistor M12, this current being IM12=N*IM11.

However, IM11=IM9+IMB, and for equilibrium we must have IM10=IM12, whence we have N*IM8=N*(IM9+IMB). In the transistor M9 there thus flows the same current as that flowing in the transistor M1, since the mirror ratio of the current mirrors formed of M3–M5 and M7–M9 is unity; consequently, in the transistor MB there flows the current required for maintaining equilibrium between the currents IM10 and IM12 of the output stage 62 shared between the current error amplifier 32' and the voltage error amplifier 42'.

Simplifying the previous relation, we thus obtain IM8=IM9+IMB, i.e., IMB=IM8−IM9=IM2−IM1.

Now, taking into account that the current error amplifier is biased with a current IP=2*(IM2−IM1) and that IMB=IQ1, then for the entire battery charging phase we have IQ1=IQ2=IM2−IM1, and the input stage of the current error amplifier 32' is still in equilibrium, whilst its bias current IP decreases gradually towards a zero value as the battery voltage VBAT increases.

Since the current IOFFS is constant, also the voltage VOFFS present across the resistor 74 remains constant—in the example considered, at a value of 100 mV—and thus the battery charging current IBAT is always equal to the programmed value—in the example considered, 1 A.

When the battery 18 reaches its full charge value, the voltage error amplifier 42' is perfectly balanced, i.e., IM1=

IM2, and the bias current IP of the input stage 70 of the current error amplifier 32' has become zero, i.e., IP=2*(IM2−IM1)=0.

Consequently, with the particular circuit topology illustrated in FIG. 5 and with the bias current IP having the pattern described above, it is possible to turn off naturally the current error amplifier 32' by decreasing progressively the current supplied to it.

In addition, with this topology it is possible to supply a constant battery charging current IBAT until the battery full charge voltage is reached, as illustrated in FIG. 4.

In this way, the evolution of the operation of the DC-DC converter 1 from the current regulation phase to the voltage regulation phase is less dependent upon the transcharacteristic of the input stage of the voltage error amplifier 42', which is a function of the current IV (which is fixed), and upon the type of transistors used (n-channel, p-channel, or bipolar transistors) and upon their size.

In addition, with the present solution, the offset on the battery voltage at the end of charging the battery is minimized. Moreover, on account of the low gain of the PNP transistors, an offset voltage VOFFS of 100 mV would not zero completely the current flowing in the transistor Q1, and this would cause a current contribution IOUT=IMB different from zero in the transistor M11, which is higher as the bias current IP is greater, thus giving rise to a final offset on the battery voltage VBAT. With the present solution, instead, since at end of charging IP=0, this contribution is cancelled out.

Biasing of the input stage 70 of the current error amplifier 32' described above presents a further advantage linked to the battery charging mode when the battery voltage is close to the full charge voltage.

In fact, in the case where the input stage 70 of the current error amplifier 32' were biased with a constant bias current IP=2*IV, the current error amplifier 32' itself would be in equilibrium as long as the differential input voltage ΔV of the voltage error amplifier 42' is such as to keep the transistor M1 off, thus charging the battery 18 with a constant current of 1 A. As soon as the differential input voltage ΔV decreases in such a way that it is no longer sufficient to keep the transistor M1 off, regulation would impose a decrease in the battery charging current IBAT before the battery voltage VBAT reaches the full charge value, so supplying less charge to the battery 18.

Consequently, it is possible to understand the advantages and benefits of a biasing that is a function of the differential input voltage ΔV both from the standpoint of efficiency and service life of the battery 18 and from the standpoint of the consumption of the current error amplifier 32', which decreases gradually during the charging phase until the natural turning off of the amplifier 32' itself.

In addition, with the circuit topology described above, it is no longer necessary to use the diode 36 to perform the decoupling of the output stages of the current error amplifier 32' and the voltage error amplifier 42', in that now the output stage is common to the two amplifiers.

In addition, with the present solution, the offset on the battery voltage at the end of charging the battery is minimized.

Figure 6:
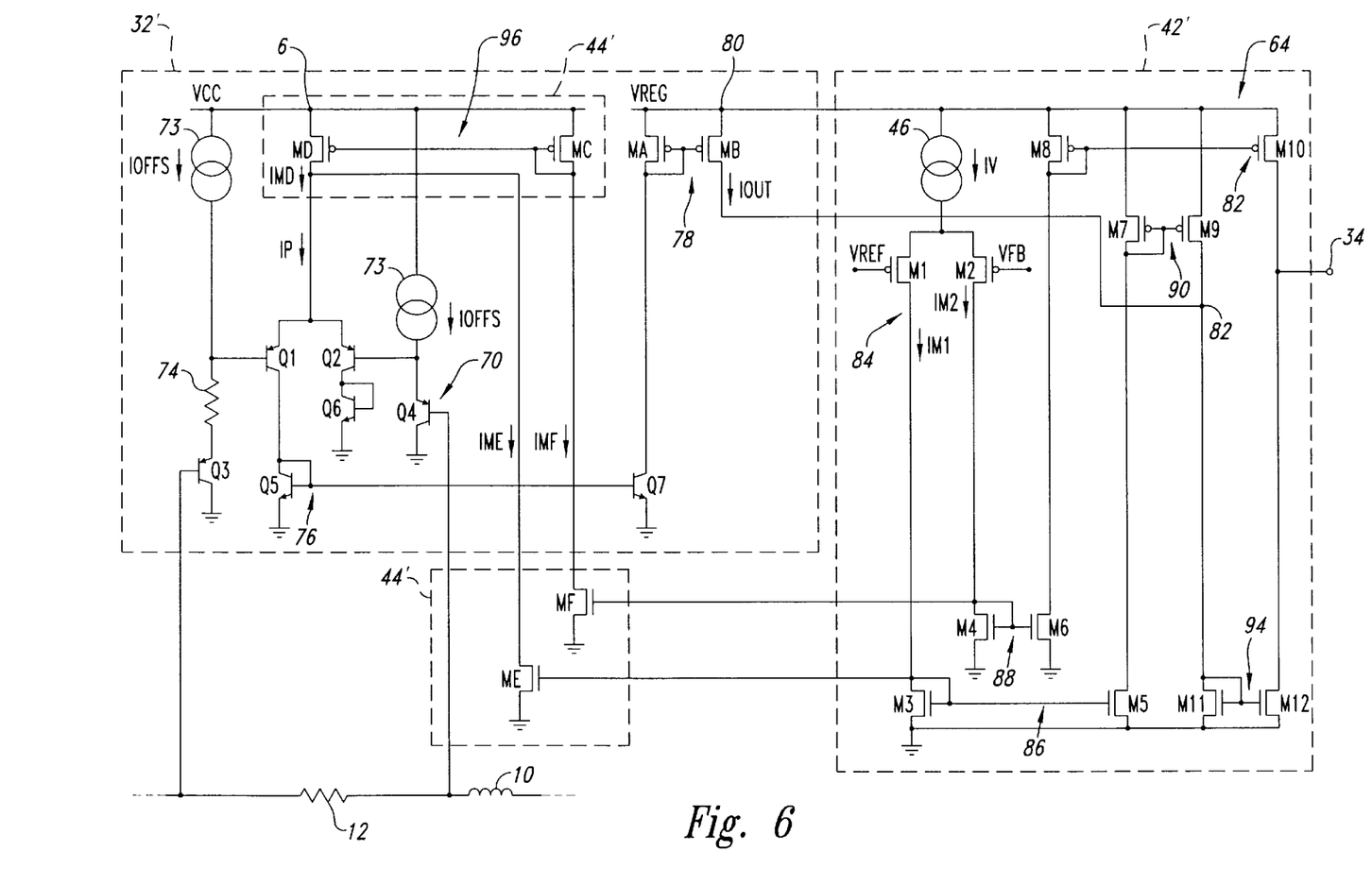

Finally, FIG. 6 illustrates the circuit diagram with the current generator 44' supplying a bias voltage IP is equal to twice the difference between the current IM2 and IM1 is made.

As illustrated in the above-mentioned figure, the current generator 44' is made by adding a third NMOS transistor ME to the current mirror 86 to mirror the current IM1 with a mirror ratio of two, and a third NMOS transistor MF to the current mirror 88 to mirror the current IM2 with a mirror ratio of two.

In particular, the transistor ME has the gate terminal connected to the gate terminals of the transistors M3 and M5, the source terminal connected to ground, and the drain terminal connected to a node 98, whilst the transistor MF has the gate terminal connected to the gate terminals of the transistors M4 and M6, the source terminal connected to ground, and the drain terminal connected to one of the two PMOS transistors MC and MD forming a current mirror 96 having a unity mirror ratio.

In particular, the transistors MC and MD present source terminals connected to the supply line 6 and gate terminals connected together; in addition, the transistor MC is diode-connected and constitutes the load of the transistor MF, i.e., it has the gate terminal connected both to its own gate terminal and to the drain terminal of the transistor MF, whilst the transistor MD has the drain terminal connected to the node 98, which in turn is connected to the emitter terminals of the transistors Q1 and Q2 of the input stage 70 of the current error amplifier 32'.

The operation of the current generator 32 described above is as follows. In the transistor MF there flows a current IMF=2*IM2, whilst in the transistor ME there flows a current IME=2*IM1. The current mirror 96 mirrors the current IMF with unity mirror factor, i.e., IMD=IMF=2+IM2, and in the node 98 there is generated the current IP as the difference between the current IMD and the current IME, i.e., IP=IMD−IME=2*(IM2−IM1).

Finally, it is clear that modifications and variations can be made to the DC-DC converter 1' described and illustrated herein without thereby departing from the protection scope of the present invention as defined by the claims and the equivalents thereof.

What is claimed is:

1. A DC-DC converter usable as a battery charger, comprising: current error amplifier means and voltage error amplifier means connected in parallel to control the charging phase of a battery, and a gradual turning off means gradually turning off said current error amplifier means in a battery charging end phase.

2. The DC-DC converter of claim 1, wherein said gradual turning off means comprise first current generating means supplying a first bias current for said current error amplifier means having decreasing amplitude in said battery charging end phase.

3. The DC-DC converter of claim 2, wherein said first bias current presents a substantially constant amplitude during the battery charging phase preceding said end phase.

4. The DC-DC converter of claim 2, wherein said gradual turning off means further comprise measuring means measuring the voltage of said battery and supplying a turning off start control signal for said first current generating means when the battery voltage is higher than a threshold value.

5. The DC-DC converter of claim 2, wherein said voltage error amplifier means comprise an input stage including first and second transistor means connected in differential configuration and said first bias current is a function of the difference between the currents flowing, in use, in said first and second transistor means.

6. The DC-DC converter of claim 5, wherein said first bias current is substantially equal to twice the difference of said currents flowing, in use, in said first and second transistor means.

7. The DC-DC converter of claim 1, further comprising second current generating means supplying a second constant bias current for said voltage error amplifier means.

8. The DC-DC converter of claim 1, wherein said current error amplifier means and voltage error amplifier means share the same output stage.

9. A method for charging a battery, comprising: supplying a current to said battery using a DC-DC converter comprising current error amplifier means and voltage error amplifier means connected in parallel to control charging of said battery, and gradually turning off said current error amplifier means in a battery charging end phase.

10. The method of claim 9, wherein said gradual turning off step comprises supplying to said current error amplifier means a first bias current having a decreasing amplitude in said battery charging end phase.

11. The method of claim 10, wherein said first bias current presents a substantially constant amplitude during a battery charging phase preceding said end phase.

12. The method of claim 10, wherein said gradual turning off step further comprises measuring the battery voltage and generating a turning off start control signal for said first current generating means when the battery voltage is higher than a threshold voltage.

13. The method of claim 10, wherein the voltage error amplifier means comprises an input stage including first and second transistor means connected in differential configuration, and supplying to said current error amplifier means a first bias current comprises generating said first bias current as a function of the difference between the currents flowing, in use, in said first and second transistor means.

14. The method of claim 13, wherein said first bias current is substantially equal to twice the difference between said currents flowing, in use, in said first and second transistor means.

15. The method of claim 9, further comprising supplying to said voltage error amplifier means a second constant bias current.

16. A DC-DC converter usable as a battery charger, comprising:

current error amplifier means and a voltage error amplifier means connected in parallel to control the charging phase of a battery and a gradual turning off means gradually turning off the current error amplifier means in a battery charging end phase, the gradual turning off means comprising first current generating means supplying a first bias current for the current error amplifier means having decreasing amplitude in the battery charging end phase.

17. A DC-DC converter usable as a battery charger, comprising:

current error amplifier means and a voltage error amplifier means connected in parallel to control the charging phase of a battery, the voltage error amplifier means comprising an input stage including first and second transistor means connected in differential configuration; and a gradual turning off means gradually turning off the current error amplifier means in a battery charging end phase, the gradual turning off means comprising first current generating means supplying a first bias current for the current error amplifier means having decreasing amplitude in the battery charging end phase, the first bias current comprising a function of the difference between the current flowing, in use, and the first and second transistor means.

18. A DC-DC converter usable as a battery charger, comprising:

current error amplifier means and a voltage error amplifier means connected in parallel to control the charging phase of a battery, the current error amplifier means and the voltage error amplifier means sharing the same output stage, and a gradual turning off means gradually turning off the current error amplifier means in a battery charging end phase.

19. A method for charging a battery comprising:

supplying a current to the battery using a DC-DC converter comprising current error amplifier means and voltage error amplifier means connected in parallel to control charging of the battery; and gradually turning off the current error amplifier means in a battery charging end phase by supplying to the current error amplifier means a first bias current having a decreasing amplitude in the battery charging end phase.

20. A method for charging a battery, comprising:

supplying a current to the battery using a DC-DC converter comprising current error amplifier means and a voltage error amplifier means connected in parallel to control charging of the battery, the voltage error amplifier means having an input stage including first and second transistor means connected in differential configuration;

generating a first bias current as a function of the difference between currents flowing, in use, in the first and second transistor means; and gradually turning off the current error amplifier means in a battery charging end phase by supplying to the current error amplifier means the first bias current having a decreasing amplitude in the battery charging end phase.

21. A battery charging regulation circuit, comprising:

a voltage error amplifier having first and second differential inputs, the first differential input coupled to a reference voltage source, the second differential input adapted to be coupled to the battery, and an output stage having an output terminal;

an amplifier adapted to detect charging current delivered to the battery, the amplifier coupled to an adjustable bias current source and configured to deliver an output current to the output stage of the voltage error amplifier; and a measuring stage coupled to the first and second differential inputs of the voltage error amplifier, and an output coupled to a control terminal of the adjustable bias current source, the measuring phase configured to generate a start-turning-off signal to the adjustable bias current source when the differential input to the voltage error amplifier is below a threshold value, the adjustable bias current source configured to provide a constant bias current to the amplifier during a charging phase and to provide a gradually reducing bias current to the amplifier in response to the start-turning-off signal.

22. The circuit of claim 21, wherein the amplifier is configured to provide an output current that maintains the output stage of the voltage error amplifier in equilibrium during the charging phase.

* * * * *